(12) United States Patent
Chien et al.

(10) Patent No.: US 12,311,272 B2
(45) Date of Patent: May 27, 2025

(54) METHOD FOR GAME ACCOUNT TRADING (71) Applicant: Gamania Digital Entertainment Co., Ltd., Taipei (TW)

(72) Inventors: Chih-hao Chien, Taipei (TW);
Cheng-yu Wang, Taipei (TW);
Wan-chen Wu, Taipei (TW)

(73) Assignee: GAMANIA DIGITAL ENTERTAINMENT CO., LTD., Taipei (TW)

( * ) Notice: Subject to any disclaimer, the term of this patent is extended or adjusted under 35 U.S.C. 154(b) by 270 days.

(21) Appl. No.: 17/773,712

(22) PCT Filed: Nov. 2, 2019

(86) PCT No.: PCT/CN2019/115185
§ 371 (c)(1),
(2) Date: May 2, 2022

(87) PCT Pub. No.: WO2021/082019
PCT Pub. Date: May 6, 2021

(65) Prior Publication Data
US 2022/0410016 A1     Dec. 29, 2022

(51) Int. Cl.
*A63F 13/79* (2014.01)
*A63F 13/35* (2014.01)

(52) U.S. Cl.
CPC .............. *A63F 13/79* (2014.09); *A63F 13/35* (2014.09)

(58) Field of Classification Search
CPC ........ A63F 13/352; A63F 13/72; A63F 13/75; A63F 13/79
See application file for complete search history.

(56) References Cited

U.S. PATENT DOCUMENTS

| | | | | |
|---|---|---|---|---|
| 8,090,618 | B1 * | 1/2012 | Chu | G06Q 30/0603 705/26.1 |
| 8,924,308 | B1 * | 12/2014 | Mehta | A63F 13/792 705/64 |
| 9,241,836 | B2 * | 1/2016 | Ukai | A63F 13/95 |
| 9,430,897 | B2 * | 8/2016 | Yates | A63F 13/60 |
| 10,518,178 | B1 * | 12/2019 | Cunningham | H04L 9/3239 |
| 11,062,284 | B1 * | 7/2021 | Cunningham | A63F 13/71 |
| 11,288,735 | B1 * | 3/2022 | Kao | G06Q 30/0617 |
| 2007/0087822 | A1 * | 4/2007 | Van Luchene | A63F 13/792 463/25 |
| 2007/0111770 | A1 * | 5/2007 | Van Luchene | G06Q 50/10 463/7 |

(Continued)

FOREIGN PATENT DOCUMENTS

| | | |
|---|---|---|
| CN | 101425164 A | 5/2009 |
| CN | 101996376 A | 3/2011 |

(Continued)

*Primary Examiner* — Chase E Leichliter
(74) *Attorney, Agent, or Firm* — MUNCY, GEISSLER, OLDS & LOWE, P.C.

(57) ABSTRACT

Through the present invention, game players can auction or transact game objects under their game accounts, such as roles, props, services, etc. The management of game account trading through the trading platform will also protect the safety of game object transactions. In addition, players can also take advantage of the functions of the present invention to manage their auctions and negotiate prices.

4 Claims, 7 Drawing Sheets

(56) References Cited

U.S. PATENT DOCUMENTS

| | | | | |
|---|---|---|---|---|
| 2009/0318221 | A1* | 12/2009 | Dhunjishaw | G06Q 20/123 |
| | | | | 463/43 |
| 2010/0222139 | A1* | 9/2010 | Wang | G06Q 30/08 |
| | | | | 463/25 |
| 2013/0097047 | A1* | 4/2013 | Kim | G06Q 20/123 |
| | | | | 705/26.4 |
| 2014/0304102 | A1* | 10/2014 | Dhunjishaw | G06Q 20/123 |
| | | | | 705/26.3 |
| 2015/0050991 | A1* | 2/2015 | Mehta | G06Q 20/3821 |
| | | | | 463/25 |
| 2016/0019536 | A1* | 1/2016 | Ortiz | G06Q 20/36 |
| | | | | 705/67 |
| 2016/0151715 | A1* | 6/2016 | Polansky | A63F 13/792 |
| | | | | 463/25 |
| 2022/0410016 | A1* | 12/2022 | Chien | G07F 17/3244 |

FOREIGN PATENT DOCUMENTS

| | | |
|---|---|---|
| CN | 104574045 A | 4/2015 |
| TW | M565853 | 8/2018 |

* cited by examiner

METHOD FOR GAME ACCOUNT TRADING

FIELD OF THE INVENTION

The present invention relates generally to a method for game account trading, and more particularly to a network trading platform connecting a plurality of game servers and auctions and transactions of different game accounts for game players.

BACKGROUND OF INVENTION

Network games, also called online games, generally refer to electronic games for multiple players to carry out interactive entertainment through computers and the Internet. When classified on the basis of the nature of the game software, such network games normally refer to large-scale multiplayer online games that require download on the client. Some online games are capable of online multiplayer campaigns or online cloud backup through server access. Network games can be categorized into strategy games, action games, sport games, fighting games, music games, racing games, and role-playing games.

In the current network games, players can transact objects using virtual currency. Some players may not have enough virtual currency, and they will have such behaviors as using material currency to exchange for virtual currency or to buy virtual items. Such as behaviors are directly connected with realistic interests, and may lead to real-world or cybercrime. All game companies strictly forbid such transactions. However, the role levels, skills, and equipment in the network games are all indirectly connected with the playing time and some players do not have so much time to play and they may have such behaviors as buying game accounts. This leads to the prevalence of cybercrimes. Such criminal behaviors like account theft through Trojans or backdoors or online phishing are very common.

In view of this, it has become an imperative task to develop a method for users to safely transact game accounts.

SUMMARY OF THE INVENTION

The present invention provides a method for game account trading, applied in a trading platform server, which is through the Internet, connected to a seller client device, a buyer client and a plurality of game servers, wherein the trading platform server comprises a trading website and a database, and the trading method comprises the following steps.

Firstly, the trading platform server receives a seller primary account name and a seller primary account password from the seller client device for verification. If the verification is successful, the trading platform server will use a seller primary account identification code of the seller primary account name to search the database and extract a plurality of game accounts corresponding to the game servers and display them on the trading website.

Then, through the seller client device, one of the game accounts is selected, and an account selection command is sent to the trading platform server, so that the trading platform server can connect the selected game server according to the account selection command, extract a plurality of game objects under the selected game account, and display them on the trading website.

Next, the seller client device select one from the displayed game objects, and edit an auction price for the selected game object. Based on the auction price, the trading platform server will generate an auction information and post it on the trading website, meanwhile, it will record a game server identification code, a game account identification code and a game object identification code in connection with the auction information in the database.

Moreover, the trading platform server will, according to the game server identification code, game account identification code and game object identification code, send a lock command to the game server to prohibit alteration of non-modifiable information data of the game object to be transacted.

Then, the buyer client device will select the auction information on the trading website, and send a buying command to the trading platform server. The trading platform server will send back a remittance account based on the buying command. The buyer client device will according to the auction price, remit to the remittance account through a method of remittance. After verification by the trading platform server, the trading platform server will send a payment notice to the seller client device.

In the end, the seller client device receives the payment notice and sends a delivery command to the trading platform server. The trading platform server receives the delivery command and sends it to the game server. The game object is searched out through the server identification code, game account identification code and game object identification code, and the game object identification code is transferred to the user primary account of buyer, and a transaction record is saved in the database.

Based on the present invention, game players can auction or transact game objects such as roles, props, and services under their game accounts. The management of game account trading through the trading platform will also protect the safety of game object transactions. In addition, players can also take advantage of the functions of the present invention to manage their auctions and negotiate prices.

DETAILED DESCRIPTION OF THE INVENTION

Below are detailed descriptions of the present invention based on a particular embodiment with reference to the accompanying drawings, so that the contents and technical efficacy of the invention can be readily understood.

Embodiment 1, Method for Game Account Trading

Figure 1:
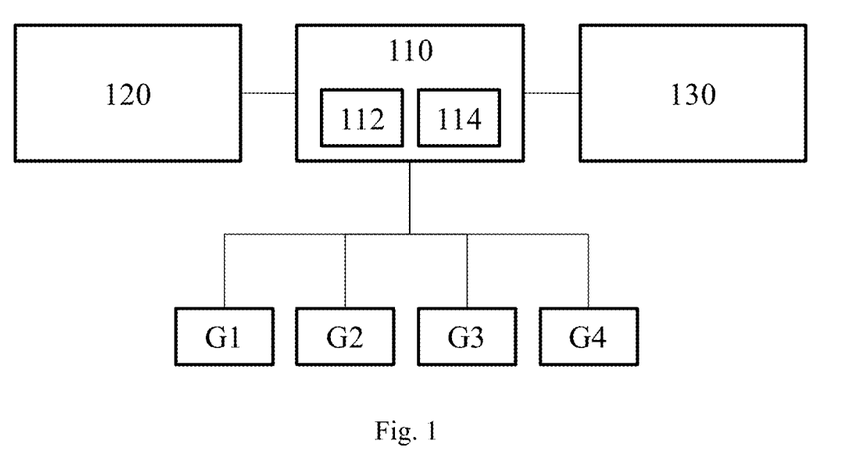
FIG. 1 is a schematic network system architecture of an embodiment application of the method for game account trading according to the invention.
Figure 2:
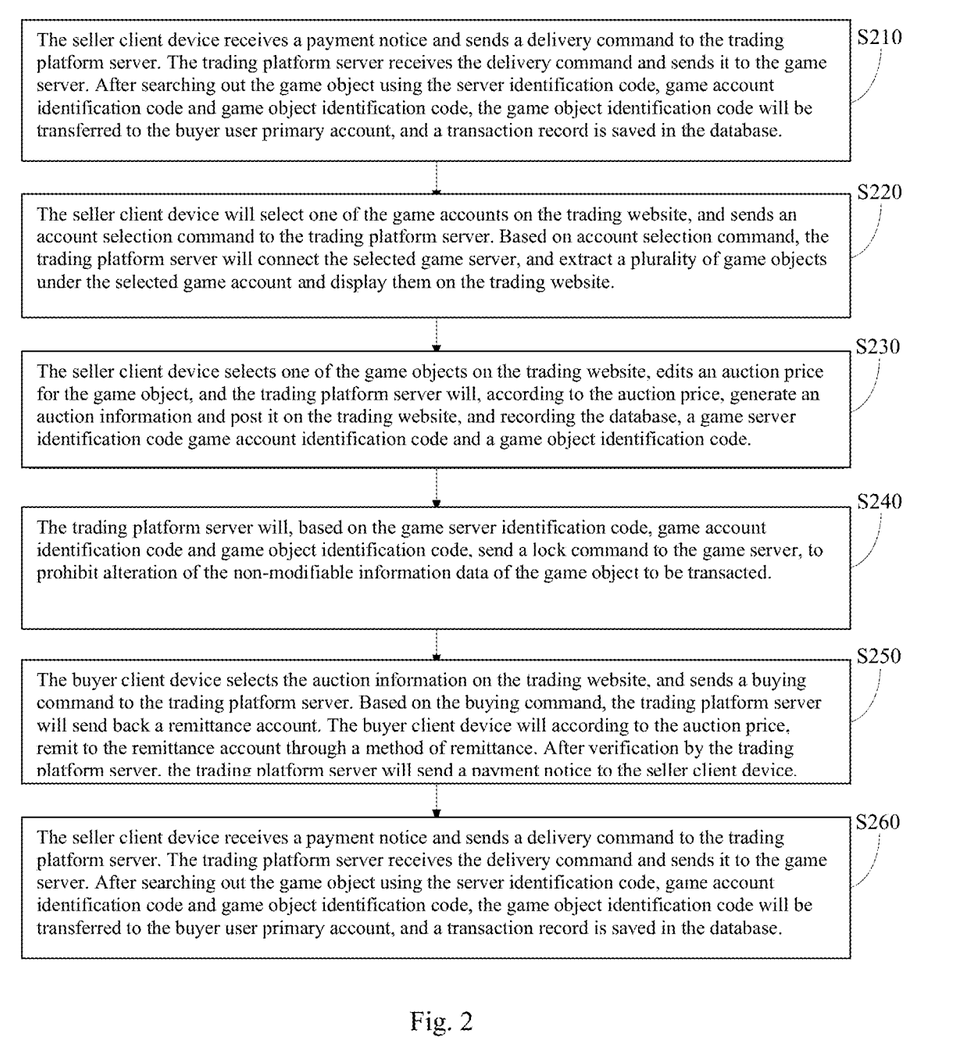
FIG. 2 is a flow diagram of an embodiment of the method for game account trading according to the invention.

FIG. 1 is a schematic network system architecture of an embodiment application of the method for game account trading according to the invention, FIG. 2 is a flow diagram of an embodiment of the method for game account trading according to the invention. Referring to FIG. 1 and FIG. 2, the present invention provides a method for game account trading to be applied in a trading platform server 110. Through the Internet, it is connected to a seller client device 120, a buyer client device 130 and a plurality of game servers G1, G2, G3, G4. The trading platform server 110 comprises a trading website 112 and a database 114. The trading method comprises Steps S210-S260.

In Step S210, the trading platform server 110 receives a seller primary account name and a seller primary account password from the seller client device 120 and conducts a verification. If the verification is successful, it uses a seller primary account identification code of the seller primary account name to search in the database 114 and extracts a plurality of game accounts corresponding to game servers G1, G2, G3, G4 and display them on a trading website 112. In a preferred embodiment, the user can register the primary account name after logging into the game servers 201, 202, 203, 204. Alternatively, the user can log into the trading website 112, and respectively input the game account and password of each of the game servers G1, G2, G3, G4, and the trading platform server 110 will bind the primary account name with the game accounts and record them in the database 114.

In Step S220, the seller client device 120 will select one of the game accounts on the trading website 112, and sends an account selection command to the trading platform server 110. Based on account selection command, the trading platform server 110 will connect the selected game server G1 (as an example), and extract a plurality of game objects under the selected game account and display them on the trading website 112. In a preferred embodiment, these game accounts can be shown in any of such forms as a list or thumbnails, as long as the user can easily identify each account of each game. After selecting any game account, the game objects under the selected game account will be displayed in any of such forms as a list or thumbnails. The present invention has no limitation on the forms.

In Step S230, the seller client device 120 selects one of the game objects on the trading website 112, edits an auction price for the game object, and the trading platform server 110 will, according to the auction price, generate an auction information and post it on the trading website 112, and record, in the database 114, a game server identification code, a game account identification code and a game object identification code. In a preferred embodiment, through the seller client device 120, a commodity description can be edited, using text to describe the features and advantages of the game object, and displayed in the auction information.

Preferably, the trading website 112 provides an editing interface 304. The editing interface 304 shows the game accounts under the seller primary account name as well as the game objects under those game accounts, for the seller client device 120 to select the game object to be transacted, and to edit the auction price and commodity description of the game object.

Figure 3A:
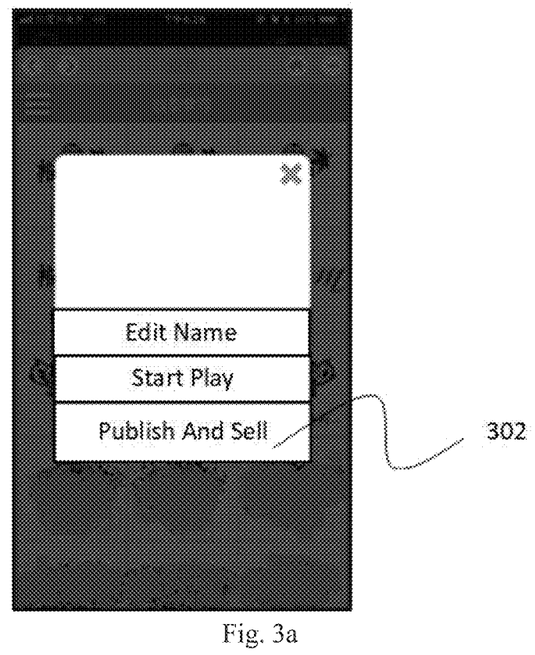
FIG. 3a to FIG. 3c illustrate the publication for sale by the game account seller according to the invention.
Figure 3B:
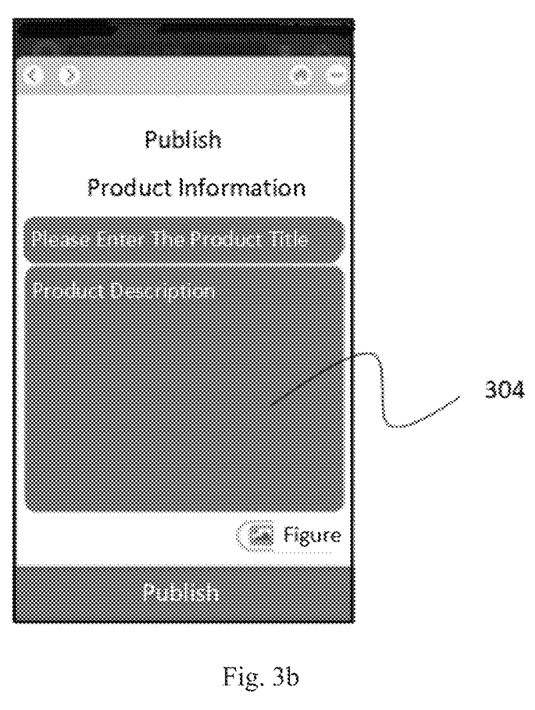
Figure 3C:
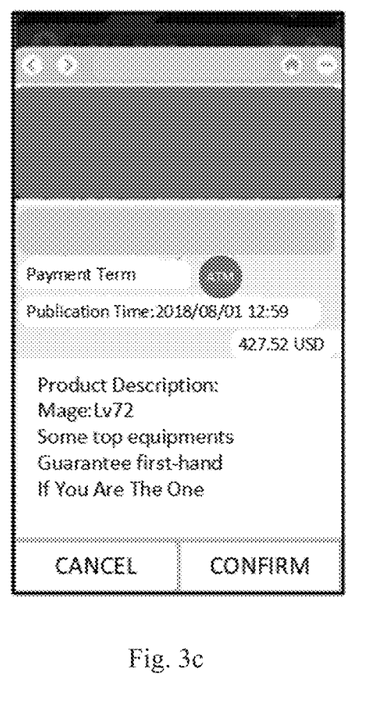

With reference to FIG. 3*a* to FIG. 3*c*, from the game menu provided by the trading website 112, the seller client device 120 can select the publication tab 302, and the trading website 112 will display an editing interface 304, so that the seller client device 120 can select the game object to be auctioned or sold, and edit the commodity description and produce the auction information. After that, the game account trading platform will publish the auction information, showing terms of payment, date of publication, price of commodity, and goods information.

In Step S240, the trading platform server 110 will, based on the game server identification code, game account identification code and game object identification code, send a lock command to the game server 201, to prohibit alteration of the non-modifiable information data of the game object to be transacted. In a preferred embodiment, the non-modifiable information data includes game role and game props, but the present invention has no limitation on this.

In Step S250, the buyer client device 130 selects the auction information on the trading website 112, and sends a buying command to the trading platform server 110. Based on the buying command, the trading platform server 110 will send back a remittance account. The buyer client device 130 will according to the auction price, remit to the remittance account through a method of remittance. After verification by the trading platform server, the trading platform server 110 will send a payment notice to the seller client device 130. In a preferred embodiment, the method of remittance is a financial payment or a credit payment. If the financial payment is not completed, or if the credits are insufficient, the trading platform server 110 will send a transaction failure message to the buyer client device 130.

Preferably, the game object comprises modifiable information data. The modifiable information data includes: level, progress and ranking, but the present invention has no limitation on this. In particular, if the trading platform server 110 has not received a payment, it will update the modifiable information data of the auction information based on a cycle time. The cycle time can be set as: one day, one week, etc. The present invention has no limitation on this. In addition, when the trading platform server 110 receives the remittance, and the remittance is successfully verified, it will stop updating the modifiable information data.

Figure 4A:
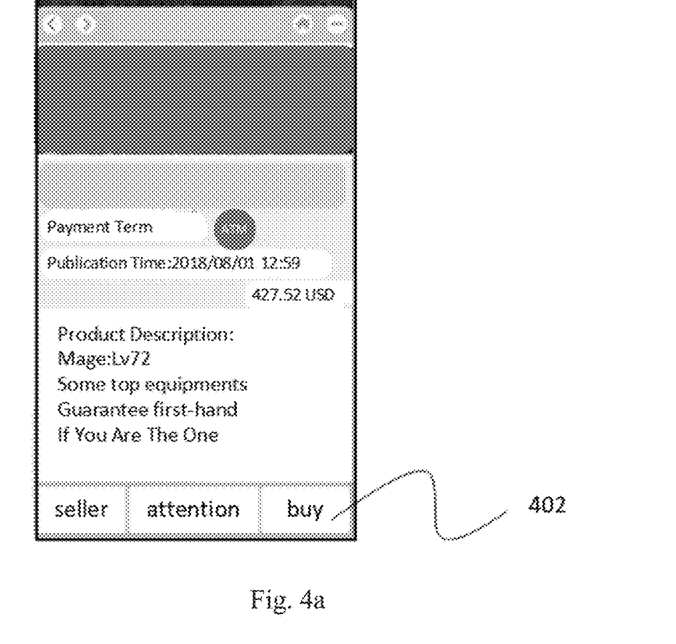
FIG. 4a to FIG. 4b illustrate the purchase by the game account buyer according to the invention.

Preferably, a trading website 112 provides a communication interface 404. The buyer client device 130 and the seller client device 120 can send messages to each other through the communication interface 404.

Embodiment 2, the Buyer Purchase the Game Account

Figure 4B:
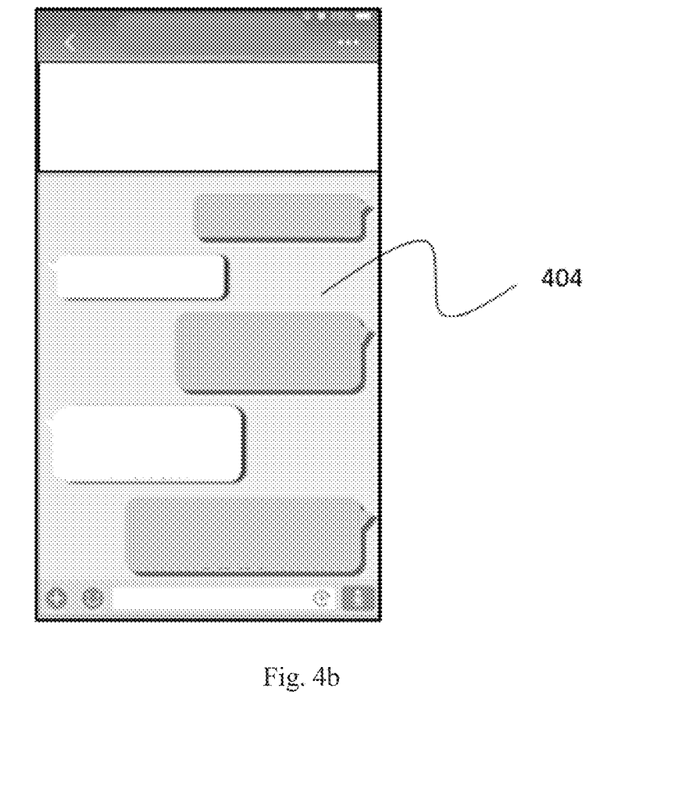

FIG. 4*a* to FIG. 4*b* illustrates the purchase of the game account buyer in an embodiment of the present invention. When browsing a trading website 112, the buyer client device 130 can select an auction information of interest, and use the communication interface 404 to conduct real-time communication or negotiation with the seller. When a buying intention is confirmed, the buying tab 402 can be selected for remittance.

In Step S260, the seller client device 120 receives a payment notice and sends a delivery command to the trading platform server 110. The trading platform server 110 receives the delivery command and sends it to the game server 201. After searching out the game object using the server identification code, game account identification code and game object identification code, the game object identification code will be transferred to the buyer user primary account, and a transaction record is saved in the database 112. In a preferred embodiment, the transaction record comprises: seller user primary account, buyer user primary account, server identification code, game account identification code, game object identification code, auction price and transaction time.

Embodiment 3, Transfer the Game Account

Figure 5A:
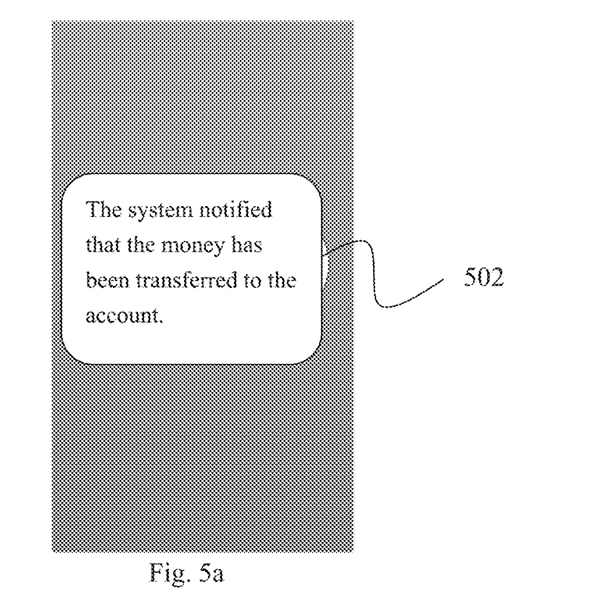
FIG. 5a to FIG. 5c illustrate the delivery of game account according to the invention.
Figure 5B:
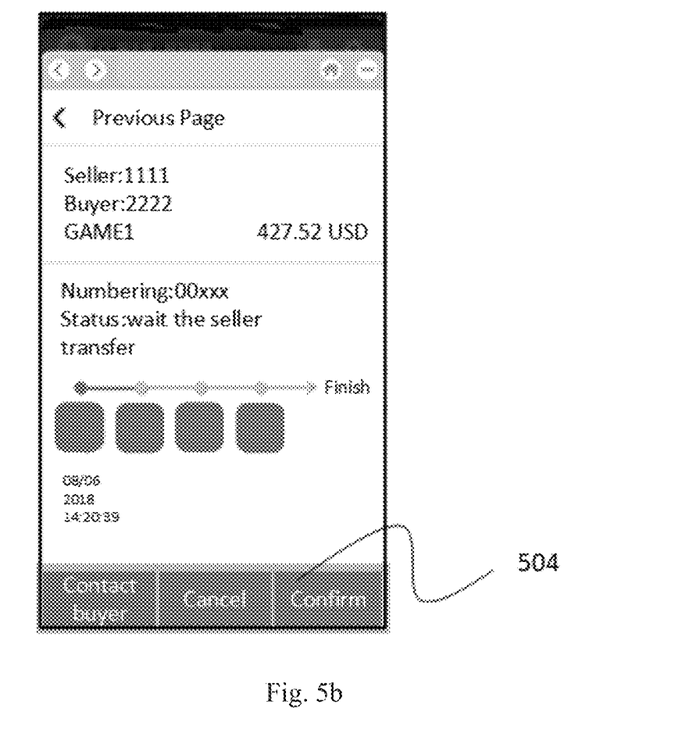
Figure 5C:
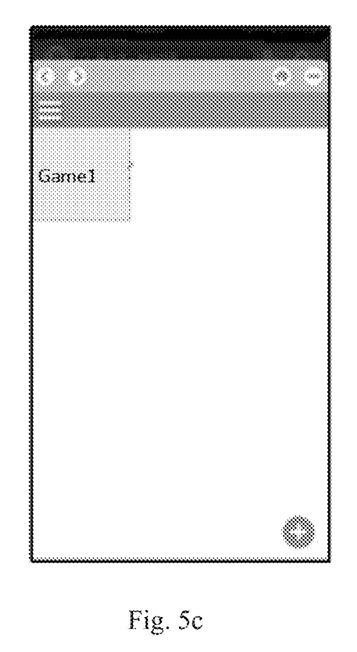

FIG. 5*a* to FIG. 5*c* illustrate the embodiment of game account transfer according to the invention. After payment is completed for the auction, the trading platform server 110 will send the payment notice 502 to the seller client device 120, the seller client device 120 can select the delivery tab 504 to complete the transaction. After that, the buyer user primary account will be updated to include the game account and the game objects.

The steps of the method for game account trading disclosed in the present invention can also be written into a software programs to be stored in any recording media that can be recognized and interpreted by any micro-processing unit, or any object or device containing the above-mentioned recording media. With no limitation to the forms, the above-mentioned object can be a hard disk, floppy disk, compact disk, ZIP, MO, IC chip, RAM, or any object containing the above recording media that can be used by those skilled in the art.

Each feature disclosed in the descriptions of the present invention can be substituted by identical, equal or similar alternatives. Hence, unless specifically indicated, each feature disclosed is only an embodiment of one type of the alternatives or similar features.

The invention claimed is:

1. A method for game account trading, applied in a trading platform server, which is through the Internet, connected to a seller client device, a buyer client device and a plurality of game servers, wherein the trading platform server includes a trading website and a database, and the game account trading method comprises:

the trading platform server receives a seller primary account name and a seller primary account password from the seller client device for verification, if the verification is successful, the trading platform server will use a seller primary account identification code of the seller primary account name to search the database and extract a plurality of game accounts corresponding to the game servers and display them on the trading website;

through the seller client device, one of the game accounts is selected, and an account selection command is sent to the trading platform server, so that the trading platform server can connect to the selected game server, according to the account selection command, extract a plurality of game objects under the selected game account, and display them on the trading website, the plurality of game objects includes a non-modifiable information data and a modifiable information data;

the seller client device selects one of the displayed game objects, and edits an auction price for the selected game object; based on the auction price, the trading platform server will generate an auction information and post it on the trading website, the trading platform server will record a game server identification code, a game account identification code and a game object identification code in connection with the auction information in the database, the auction information includes a commodity description, terms of payment, date of publication, price of commodity, and the game objects information;

the trading platform server will according to the game server identification code, game account identification code and game object identification code, send a lock command to the game server to lock the non-modifiable information data of the game object of the game account to be transacted, the trading platform server will update the modifiable information data of the auction information based on a cycle time, the non-modifiable information data includes game role and game props, the modifiable information data includes: level, progress and ranking;

the buyer client device will select the auction information on the trading website, and send a buying command to the trading platform server, the trading platform server will send back a remittance account based on the buying command, the buyer client device will according to the auction price, remit to the remittance account through a method of remittance, after verification by the trading platform server, the trading platform server will send a payment notice to the seller client device; when the trading platform server receives the remittance, and the remittance is successfully verified, the trading platform server will stop updating the modifiable information data; and the seller client device receives the payment notice and sends a delivery command to the trading platform server, the trading platform server receives the delivery command and sends it to the game server, the game object is searched out through the server identification code, game account identification code and game object identification code, and the game object identification code is transferred to a user primary account of the buyer client device; and a transaction record is saved in the database.

2. The method for game account trading of claim 1, wherein the trading website provides a communication interface, the buyer client device and the seller client device can send messages to each other through the communication interface.

3. The method for game account trading of claim 1, wherein the method of remittance is a financial payment or a credit payment.

4. The method for game account trading of claim 1, wherein if the trading platform server does not receive the remittance or the verification fails, the trading platform server will send a transaction failure message to the buyer client device.

* * * * *